United States Patent [19]
Hull

[11] 3,918,171
[45] Nov. 11, 1975

[54] ACOUSTICAL VEHICLE DRYER
[75] Inventor: Donald A. Hull, Van Nuys, Calif.
[73] Assignee: The Allen Group, Inc., Melville, N.Y.
[22] Filed: May 28, 1974
[21] Appl. No.: 473,686

[52] U.S. Cl.................... 34/243 C; 34/229; 34/233
[51] Int. Cl.² ........................................ F26B 19/00
[58] Field of Search ............ 34/105, 217, 228, 229, 34/230, 232, 233, 243 C; 15/DIG. 2, DIG. 7, 307, 302

[56] References Cited
UNITED STATES PATENTS

| | | | |
|---|---|---|---|
| 2,758,392 | 8/1956 | Vani et al. | 34/229 |
| 2,874,485 | 2/1959 | Wilson | 34/230 |
| 3,367,040 | 2/1968 | Vani | 34/230 |
| 3,583,686 | 6/1971 | Mackey | 34/105 |
| 3,754,336 | 8/1973 | Field | 34/230 |

*Primary Examiner*—Kenneth W. Sprague
*Assistant Examiner*—James C. Yeung
*Attorney, Agent, or Firm*—Fulwider, Patton, Rieber, Lee & Utecht

[57] ABSTRACT

An acoustical vehicle dryer including an inverted U-shaped frame disposed over a vehicle path and having a pair of vertically elongated side nozzles disposed on either side of such path. A pair of housings are formed with respective vertically extending transition chambers leading from relatively small cross sectional inlets to expand and form relatively large cross sectional plenum chambers connected with such nozzles. A pair of intake silencers are connected with the respective inlets to the transition chambers and each are formed with circuitous intake passages including at least one divider defining a turnback passage, such passage being lined with a sound repressive liner. A plurality of coextensive directional vanes are disposed in the transition chambers and commence in respective first ends disposed in the inlets and spaced apart relatively short distances, such vanes projecting vertically from such inlets and turning inwardly to diverge apart vertically and project towards the nozzles to cooperate together throughout their respective lengths to form diverging air passages. Producers are interposed between the respective intake silencers and plenum chambers whereby actuation of such producers will draw air into the intake silencers to compress such air while repressing the noise at such intake. The air expelled from the producers is directed into the diverging air passages to be turned gradually inwardly towards such nozzles while expanding in such passages for expulsion into the plenum chambers, from where it will be distributed substantially equally throughout the full vertical length of such side nozzle while the noise generated thereby will be generally muffled in such plenum chambers.

9 Claims, 11 Drawing Figures

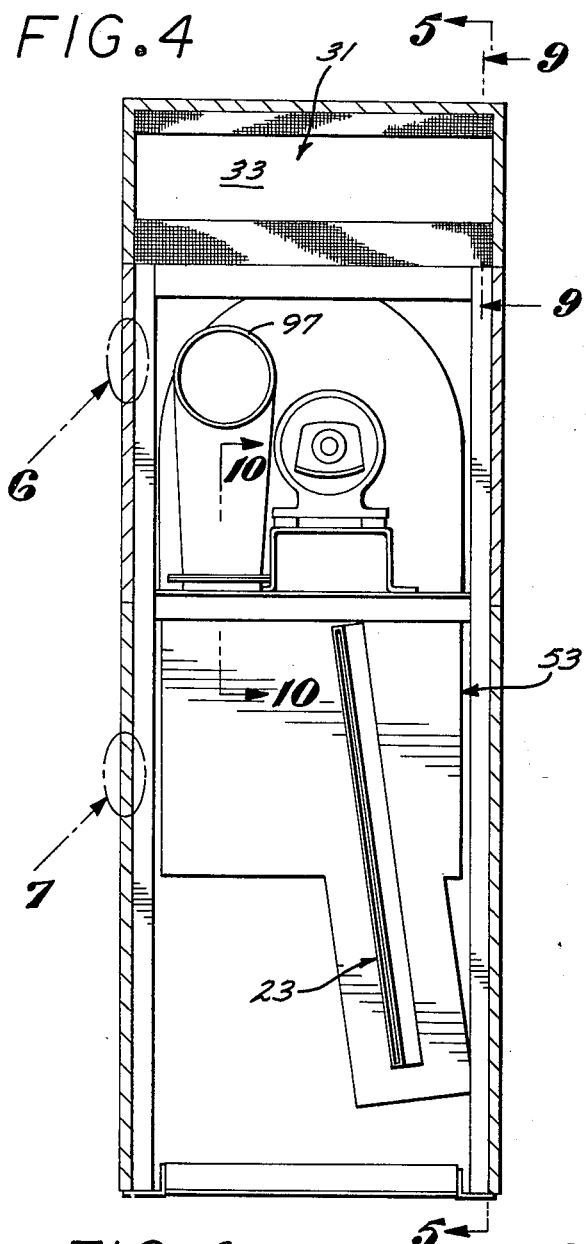
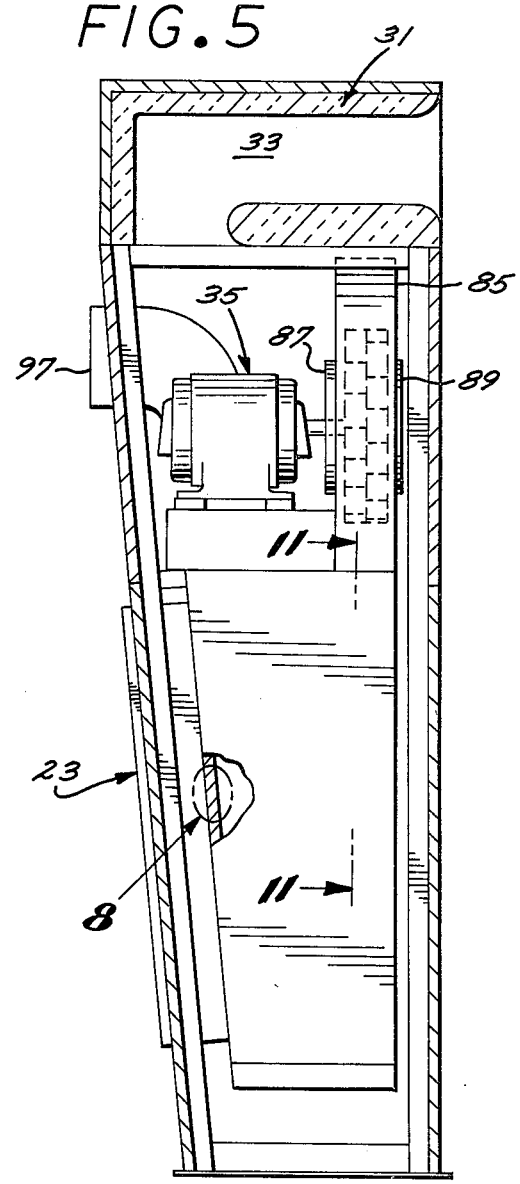
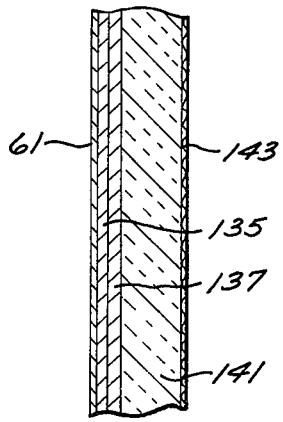
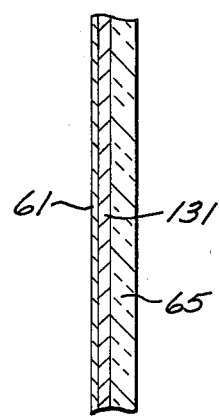
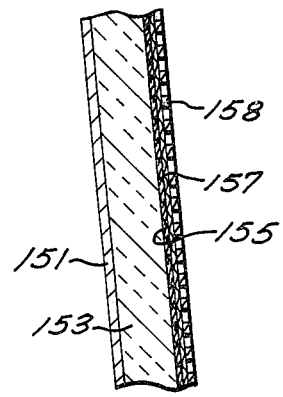

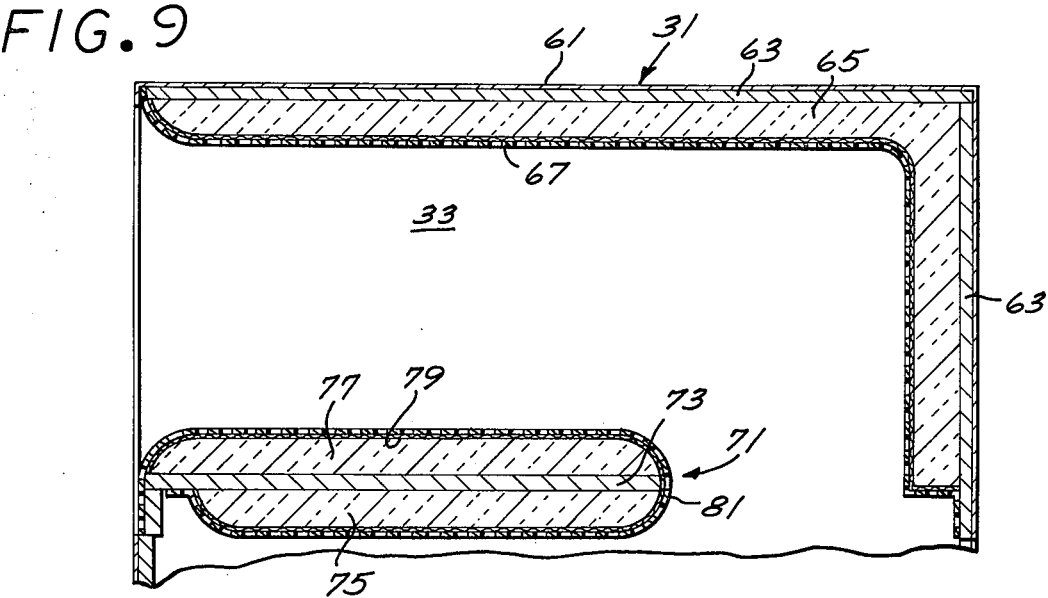
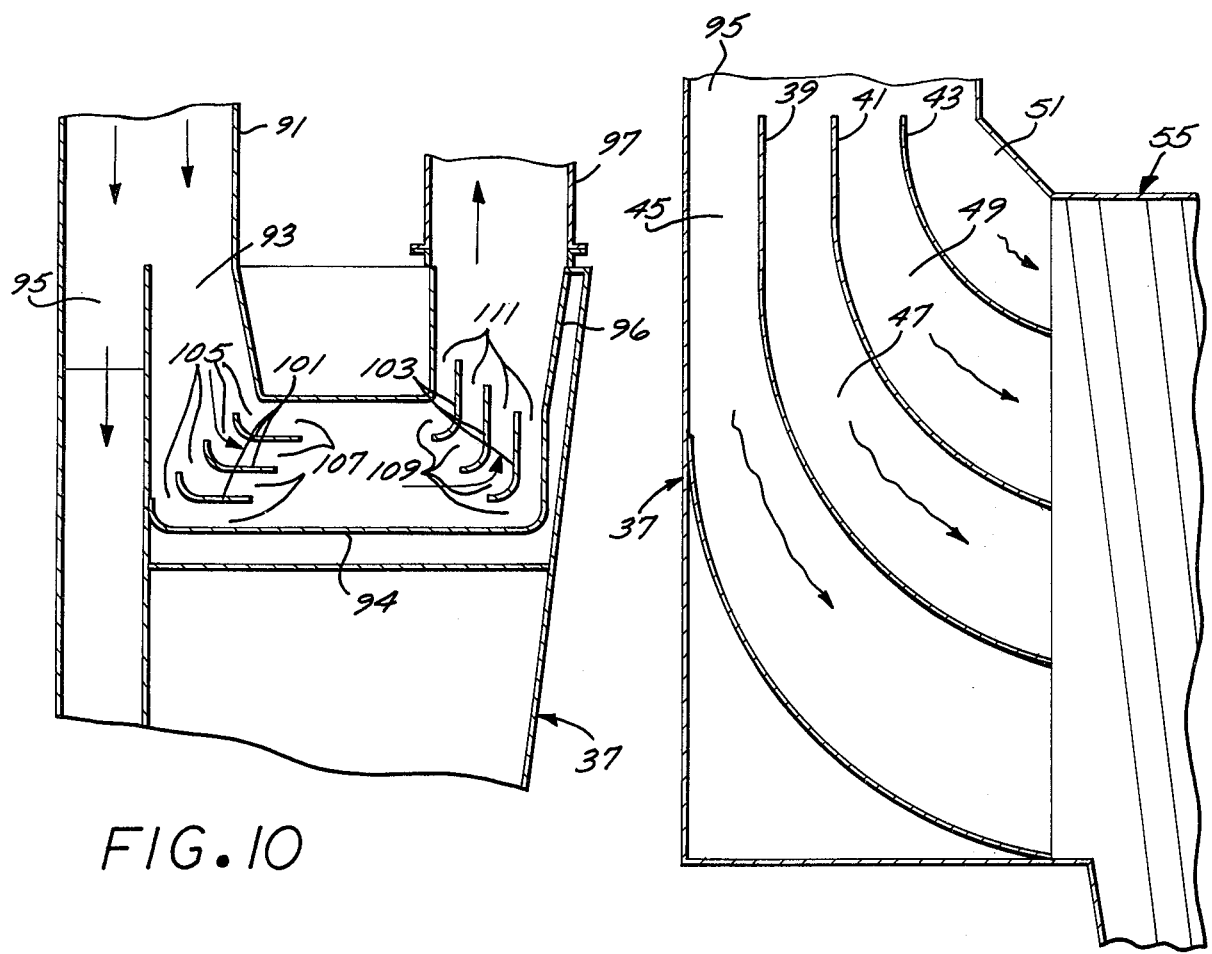

ACOUSTICAL VEHICLE DRYER

BACKGROUND OF THE INVENTION

1. Field of the Invention

The present invention relates generally to vehicle dryers and, more particularly, to a relatively quiet vehicle dryer which may be operated for extended periods of time without adverse affect on workmen or other personnel located proximate thereto.

2. Description of the Prior Art

Many different types of vehicle dryers have been proposed to accelerate drying of a vehicle as it emerges from an automatic car wash installation. However, with the present day concern over noise pollution and enactment of noise abatement legislation, as for example the Occupational Safety and Health Act (OSHA), many such dryers cannot be operated for extended periods of time with workmen performing duties in the areas thereof. Efforts have been made to design low noise level dryers but generally such efforts have resulted in substantial reduction of the volumetric flow of air in order to reduce the noise levels thus resulting in slower drying of the vehicles and consequent loss of revenue due to the reduced level of performance.

SUMMARY OF THE INVENTION

The most significant departure from standard design techniques for vehicle dryers of the present invention is the provision of a pair of intake silencers which are formed with circuitous intake passages lined with noise repression liners and leading to the relatively small cross sectional inlets to transition chambers which project vertically and then turn horizontally to expand vertically and join with vertically elongated plenum chambers having vertically elongated side nozzles connected therewith and disposed on opposite sides of a car path for blowing air on the sides of a car moving relative thereto. Respective producers are interposed between the silencers and inlet to the transition chambers and directional vanes commence at one end at the inlet to such transition chambers and then project vertically for a short distance and then curve gradually to project in a horizontal direction while diverging apart to thereby cooperate together in forming therebetween diverging air passages leading to the respective nozzles. Consequently, during operation the producers draw air into intake silencers and compress such air for introduction into the intake of the transition chambers where such air is received in the diverging passages for direction thereof along gradually curving paths for partial expansion prior to introduction into the respective plenum chambers where noise generated thereby is repressed and such air is exhausted through the vertically elongated side nozzles.

The objects and advantages of the present invention will become apparent from consideration of the following detailed description when taken in conjunction with the accompanying drawings.

BRIEF DESCRIPTION OF THE DRAWINGS

FIG. 4 is a vertical sectional view taken along the line 4—4 of FIG. 1;

FIG. 5 is a vertical sectional view taken along the line 5—5 of FIG. 4;

FIG. 6 is a detail view, in enlarged scale, taken from the circles 6 of FIGS. 4 and 5;

FIG. 7 is a detail view, in enlarged scale, taken from the circle 7 in FIG. 4;

FIG. 8 is a detail view, in enlarged scale, taken from the circle 8 in FIG. 5;

FIG. 9 is a vertical sectional view, in enlarged scale, taken along the line 9—9 of FIG. 5;

FIG. 10 is a vertical sectional view, in enlarged scale, taken along the line 10—10 of FIG. 4; and FIG. 11 is a vertical sectional view, in enlarged scale, taken along the line 11—11 of FIG. 5.

DESCRIPTION OF THE PREFERRED EMBODIMENT

Figure 1:
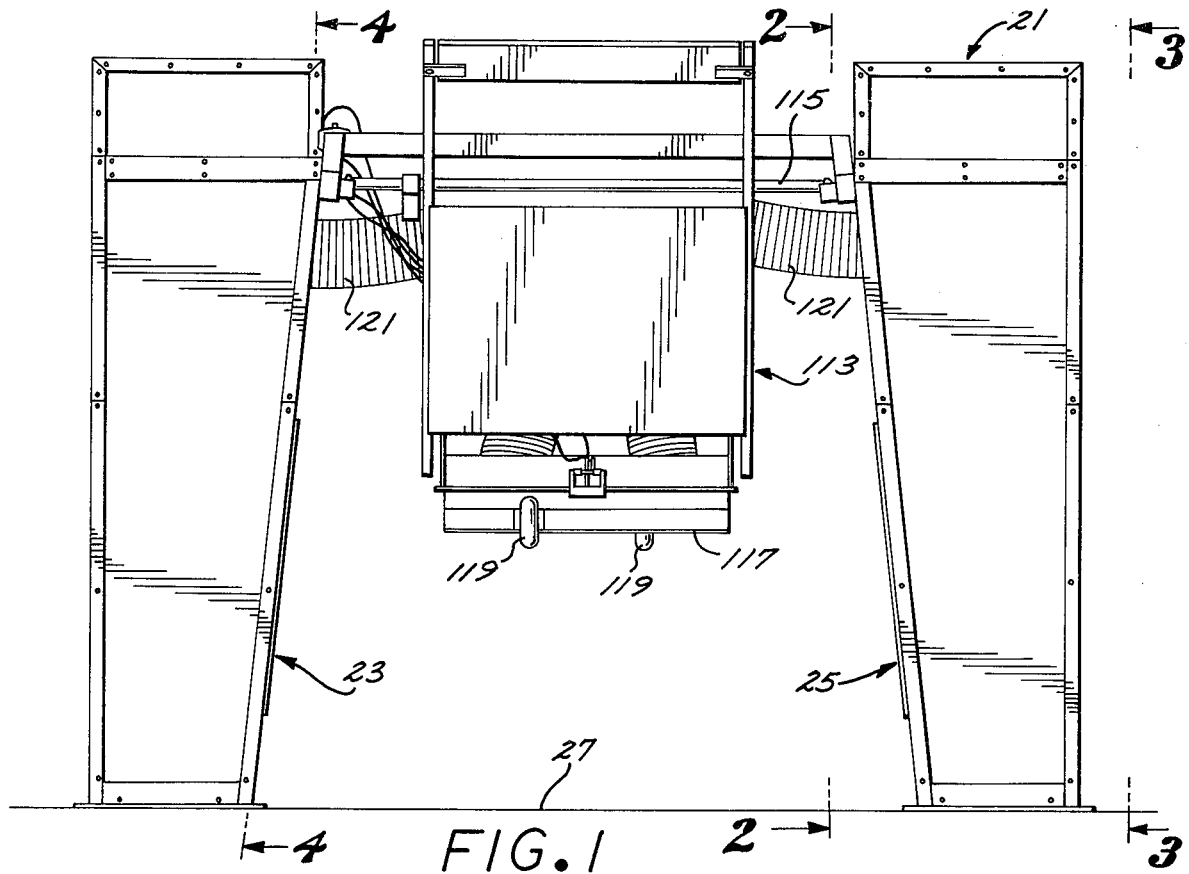
FIG. 1 is a front elevational view of an acoustical vehicle dryer embodying the present invention.
Figure 2:
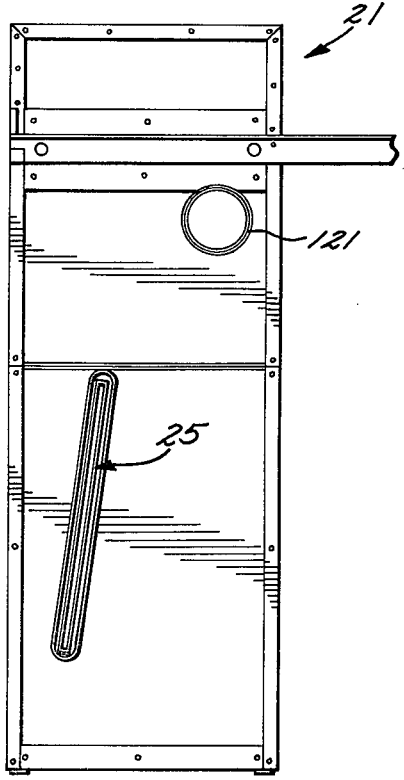
FIG. 2 is a vertical sectional view taken along the line 2—2 of FIG. 1.
Figure 3:
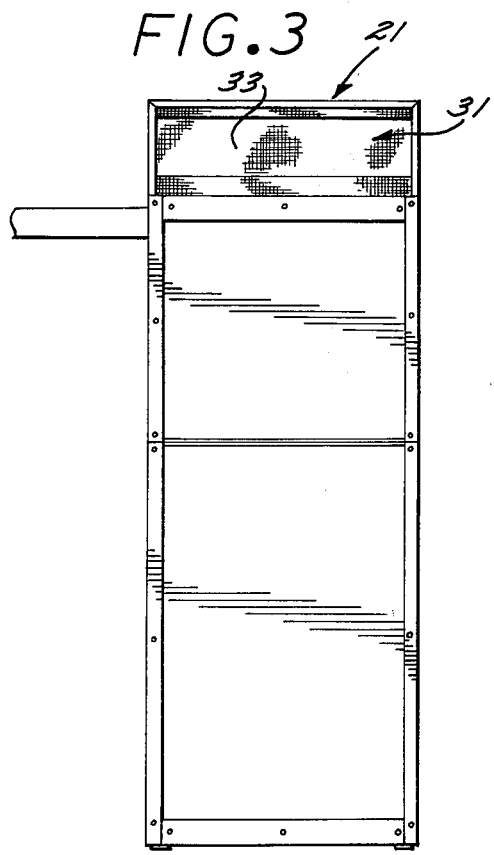
FIG. 3 is an end view taken along the line 3—3 of FIG. 1.

Referring to FIG. 1, the acoustical vehicle dryer of the present invention includes, generally, an inverted U-shaped frame 21 mounting a pair of vertically elongated side nozzles 23 and 25 on opposite sides of a vehicle path 27. The air flow paths leading to the nozzles 23 and 25 are substantially the same and, referring to FIG. 5, the nozzle 23 receives intake air from an intake silencer, generally designated 31, which is formed with a circuitous turnback intake passage 33 that leads to a producer, generally designated 35. The producer feeds air into the small end of a transition chamber, generally designated 37 (FIG. 11) and such transition chamber leads downwardly and turns inwardly while expanding in a vertical direction and includes a set of directional vanes 39, 41 and 43 which project downwardly for a short distance and then curve inwardly towards the side nozzle 23 while diverging apart to form therebetween respective curved and divergent flow passages 45, 47, 49 and 51. The lower extremities of the respective flow passages lead to respective plenum chambers 53 which mount the respective nozzles 23 and 25 from the respective one sides thereof. Consequently, upon operation of the producers 35 the air will be drawn into the intake passages 33 (FIG. 5) with the circuitous path thereof tending to trap and muffle noise generated by the high volume flow and such air will be compressed by the producers 35 and exhausted downwardly into the divergent transition passages 45, 47, 49 and 51 (FIG. 11) to be turned gradually inwardly while expanding for flow in a horizontal direction into the respective plenum chambers 53. The noise from the air entering the plenum chambers will be muffled by such chambers and will be distributed substantially uniformly throughout the vertical length of the respective side nozzles 23 and 25 for uniform impingement on the sides of a vehicle passing thereby.

The entire dryer is housed in a laminated sound repressing cabinet and, referring to FIG. 9, the exterior shell 61 of such cabinet is perferably of aluminum sheet. The top and rear wall of the silencer 31 is constructed with the aluminum shell 61 lined with a ½ inch layer of plywood 63 with a 2 inch thick layer of fiber glass duct-liner insulation 65 lining such plywood. A suitable commercially available insulation is 2.5 pound per cubic foot A.W. uncrushed fiber glass compressed to a density of 5 pounds per cubic foot. The fiber glass insulation 65 is coated on its interior with perforated sheet metal 67 to hold such insulation captive against being drawn into the producers 35 upon flow thereby of high volumes of air. The perforated metal sheet 67 is 10 gauge sheet metal formed with ⅛ inch diameter holes providing an open area of at least 25 percent with such open area being about 40 percent of the entire area of such sheet.

Still referring to FIG. 9, a divider, generally designated 71, projects horizontally into the silencer 31 and is formed by a structural plate 73 sandwiched between layers of fiber glass insulation 75 and 77. The exterior of such fiber glass insulation is wrapped with window screen 79 and such window screen is, in turn, covered with a perforated metal sheet cover 81 similar to the sheet 67. The window screen 79 is commercially available under the trade name PERMASCREEN and is of a 10 ounce bulk fabric as distributed by Bay Mills.

Referring to FIG. 5, the producers 35 include annular blower housings 85 which are donut-shaped to form axial inlets 87 and 89 on the opposite sides thereof. The producers 35 feed downwardly therefrom into ducts 91 (FIG. 10) which divide into top nozzle passages 93 and side nozzle passages 95. Referring to FIG. 11, the side nozzle passages 95 join with the top ends of the transition chambers 37, it being recalled that such transition chambers project downwardly and then curve horizontally inwardly while expanding in a vertical direction to accommodate substantially equal vertical spacing throughout the curved diverging directional vanes 39, 41 and 43.

Referring to FIG. 10, the top nozzle passage 93 projects downwardly from the supply duct 91 and turns horizontally to form a horizontal length 94 and then turns to form a vertically, upwardly projecting length 96 which joins with a top nozzle feed elbow 97. Spaced at equidistance across the respective vertical-to-horizontal and horizontal-to-vertical bend areas of the top nozzle feed duct are respective directional vanes 101 and 103. The vanes 101 are spaced apart to form upwardly facing inlets 105 and then project downwardly to curve through substantially a 90° angle and project horizontally and terminate in ends forming horizontal outlets 107. The downstream directional vanes 103 are spaced apart at their lower extremities to form horizontal inlets 109 confronting the respective outlets 107 and then curve gradually to form upwardly projecting lengths which terminate in spaced apart ends defining vertically upwardly opening outlets 111.

Referring to FIG. 1, a top blower nozzle, generally designated 113, is carried pivotally from the U-shaped frame 21 for rocking about a horizontal axis 115 and is formed in its lower extremity with a transversely elongated orifice 117 which closely follows the top contour of a vehicle for impingement of drying air directly thereon. Actuating wheels or feelers 119 are provided for following the top contour of the car. Air is introduced to the top nozzle 113 from the opposite sides thereof by means of flexible conduits 121 which are connected on their opposite extremities with the respective top nozzle elbows 97.

As mentioned hereinabove, the respective plenum chambers 53, transition chambers 37 and silencers 31 are housed in respective sound repressive cabinets with the lower halves of such cabinets housing the plenum chambers 53. Referring to FIG. 7, such lower halves of the cabinets are formed by the aluminum shell 61 lined with a ½ inch thick layer of plywood 131 which is lined with a 1 inch layer of fiber glass ductliner similar to the ductliner 65.

The intermediate portions of the cabinets house the producers 35 and, referring to FIG. 6, are formed by the aluminum shell 61 lined with a ½ inch layer of plywood 135, such plywood being in turn lined with a layer of gypsum wallboard 137. The gypsum wallboard has a 2 inch layer of fiber glass compressed to 5 pounds per cubic foot and designated 141, disposed thereon and such fiber glass is lined on its inside with window screen 143. The fiber glass 141 may be similar to the fiber glass insulation 65 and the window screen 143 similar to the window screen 79.

The upper portion of the cabinets immediately below the silencers 31 are formed similar to the construction shown in FIG. 6 and each include a 0.115 inch thick steel sheet defining an exterior shell 151 (FIG. 8) which is covered with fiber glass compressed to 5 pounds per cubic foot and designated 153, which insulation is in turn covered with a fiber glass cloth 155. The interior of the housing in this area is covered with a window screen 157 which is in turn covered with perforated sheet steel 158 similar to the sheet 67.

In operation, the acoustical dryer of the present invention is conveniently mounted over a car path 27 and a car, after being washed, passes beneath the top nozzle 113 traveling in a direction out of the drawing as viewed in FIG. 1, thereby subjecting both the top of the car and the opposite sides thereof to drying air dispensed from the top nozzle orifice 117 and side nozzles 23 and 25. It has been shown that the producers 35 may be powered by a pair of 40-horsepower motors to provide some 14,900 C.F.M. flow apiece without causing the dryer to exceed the O.S.H.A. standards. Energization of such producers draws intake air in through the intake passages 33 at a high rate of speed, thereby generating a relatively high level of noise as such air travels through the passages 33. It will be appreciated that the inlets to the intake passages 33 are relatively large and are relatively high on the dryer to minimize the noise generated by the inrushing air and cause such passages to draw from the relatively dry air spaced above the floor of the car wash installation.

Referring to FIG. 9, the air stream drawn inwardly into the air passage 33 in a horizontal direction is immediately turned downwardly by the back wall of the silencer 31 and wraps around underneath the divider 71 to branch out and enter the opposite inlets 87 and 89 of the blower housing 85. It will be appreciated that the perforated metal 67 permits passage therethrough of vibrations for dampening thereof within the fiber glass insulation 65 while protecting such insulation from being drawn from the walls of the silencers 31 by the relatively high forces generated by the fast moving air. As the air stream reverses travel beneath the divider 71 (FIG. 5) the noise generated thereby will not only be blocked from direct communication out the inlet to such silencer by means of the divider 71, but will be muffled by such silencer, as well as the laminated housing (FIG. 6) which provides for propagation of the sound through the window screen 143 for absorption thereof within the insulation 141 and reflection back into such insulation by the plywood 151 and gypsum wallboard 137.

Referring to FIG. 5, from the intake silencer 31, the incoming air is drawn into the opposite inlets 87 and 89 of the blower housing 85 and is compressed and discharged from such blower housing and down the supply duct 91 (FIG. 10) to be divided between the respective side nozzle ducts 95 and top nozzle ducts 93. The air stream directed through the side nozzle ducts 95 is fed directly into the upwardly facing inlet ends of the transition passages 45, 47, 49 and 51 (FIG. 11) and will be directed in streamlined flow around the curve defined by such passages and will expand as such passages diverge to exhaust from such passages in a substantially horizontal direction and be distributed substantially uniformly throughout the vertical length of the outlet from the transition chamber 37. The air exhausting from the respective transition chambers 37 is introduced into the respective plenum chambers 53 to form reservoirs of air immediately behind the respective side nozzles 23 and 25. Noise generated and carried by such air will be transmitted through the walls of such transition chambers 37 and plenum chambers 53 towards the laminated cabinet walls to be absorbed thereby. It will be appreciated that the streamlined shape and gradual divergence of the transition passages 45, 47, 49 and 51 (FIG. 11) will maintain substantially streamlined flow and prevent the formation of vortices and the like and consequent loss of flow volume and generation of noise.

Referring to FIG. 10, it is particularly important that the flow between the side nozzle duct 95 and top nozzle duct 93 is maintained in a balanced ratio to avoid starvation of the top nozzle 113 (FIG. 1). Thus, it is important that the duct leading to the top nozzle provides for substantially uniform and streamlined flow to avoid buildup of self-generated back pressure and the generation of additional noise due to the formation of vortices and generally irregular flow. Consequently, the directional vanes 101 and 103 are extremely important in directing uniform and gradual turning of the air as it turns from downward flow to flow horizontally through the horizontal length 94 and then be turned gradually in a streamlined fashion to flow upwardly through the vertical duct length 96 to the top blower supply elbow 97. The air exhausting through the respective top blower supply elbows 97 is fed through the flexible ducts 121 (FIG. 1) and into the opposite sides of the top blower nozzle 113 to provide drying air at the outlet orifice 117.

It has been proven that with the acoustical dryer of the present invention, the decibel level at the intake is reduced from 116 decibels to approximately 85 decibels and that the noise level in the vicinity of the dryer falls below the 90 decibel limit set by O.S.H.A. for 8 hours of continuous exposure. This is true even for flow rates through the nozzles at approximately 15,000 C.F.M. and at a speed of approximately 167 miles per hour.

From the foregoing, it will be appreciated that the acoustical dryer of the present invention provides a rapid and effective means for drying vehicles as they exit an automatic car wash installation without the attendanat irritating and dangerous noise levels normally associated with high volume dryers of this type.

Obviously, many modifications and variations of the present invention may be made with regard to the foregoing detailed description without departing from the spirit of the invention.

I claim:

1. An acoustical vehicle drying apparatus comprising:

a frame disposed on a vehicle path;

a pair of vertically elongated side nozzles disposed on either side of said path;

a pair of housings formed with respective transition chambers leading from respective small cross section inlets and expanding to outlets leading to relatively large volume plenum chambers connected with said respective nozzles;

a pair of intake silencers connected with said respective inlets and each including a housing formed with an intake passage terminating at one end in an inlet opening and including at least one divider wall projecting inwardly from said inlet to define a turn back passage projecting along opposite sides thereof;

sound repressive means lining said intake passages and opposite sides of said divider walls;

producer means interposed between said respective intake silencers and plenum chambers; and a plurality of coextensive directional vanes in said transition chambers commencing in respective first ends disposed in said inlets and then projecting vertically and curving gradually inwardly towards said respective nozzles while curving to diverge apart to cooperate together in forming diverging air passages and terminating in second ends spaced apart relatively large distances and substantially confronting said nozzles whereby said producer means may be energized to draw air in through said respective intake passages and to then compress said air and blow it vertically into said diverging air passages where it will be turned gradually inwardly and be expanded to exit said nozzles to dry a vehicle passing thereby.

2. An acoustical vehicle drying apparatus according to claim 1 wherein:

said intakes are disposed vertically above said transition chambers; and said producer means include respective producer units interposed between said respective intakes and transition chambers.

3. An acoustical vehicle drying apparatus according to claim 1 that includes:

a top nozzle disposed intermediate said side nozzles and formed with a horizontally elongated, downwardly opening orifice;

top nozzle supply ducts leading vertically from said respective intakes and then turning at a first elbow to project along a horizontal length and then turning at a second elbow to project along a vertical length and finally connect with the respective opposite ends of said top nozzle;

first directional vanes disposed in said first elbows and formed to define therebetween passages having vertically opening inlets confronting said intakes and then curving to project horizontally and terminating in passage outlets; and second directional vanes in said second elbows and cooperating to form passages having inlets confronting said respective passage outlets and then gradually curving to project vertically.

4. An acoustical vehicle drying apparatus according to claim 1 that includes:

a cabinet encasing said housings and formed by laminations of an exterior skin lined with a lamination of wood and itself lined on its interior with a fiber glass liner.

5. An acoustical vehicle drying apparatus according to claim 1 that includes:
  a cabinet housing said producer means and formed by lamination of an exterior skin lined with a lamination of wood, and itself lined with a lamination of gypsum wall-board lined with a lamination of fiber glass, lined with screen.

6. An acoustical vehicle drying apparatus according to claim 1 wherein:
  said producer means includes respective blowers disposed above said diverging chambers and disposed to one side thereof and further including respective drive motors connected therewith; and
  said intake silencers include housings defining said respective intake passages to commence at respective inlets opening to said respective one side and projecting horizontally inwardly therefrom for a predetermined distance, then turning downwardly and back towards said respective one side to communicate with said respective blowers.

7. An acoustical vehicle drying apparatus according to claim 1 that includes:
  a sound repressive cabinet surrounding said respective housings, intake silencers and producer means, said cabinet including an outer skin lined with laminations of wood and fiber glass.

8. An acoustical vehicle drying apparatus according to claim 1 wherein:
  said nozzle orifices are lined with a perforated liner.

9. An acoustical vehicle drying apparatus according to claim 1 wherein:
  said directional vanes are spaced apart equidistant throughout the length thereof.

* * * * *